United States Patent [19]

Kreibich et al.

[11] 4,181,643

[45] Jan. 1, 1980

[54] PROCESS FOR THE MANUFACTURE OF CRYSTALLINE, CROSSLINKED EPOXIDE RESINS

[75] Inventors: Ursula Kreibich, Riehen; Rolf Schmid, Gelterkinden, both of Switzerland

[73] Assignee: Ciba-Geigy Corporation, Ardsley, N.Y.

[21] Appl. No.: 896,276

[22] Filed: Apr. 14, 1978

Related U.S. Application Data

[63] Continuation of Ser. No. 680,264, Apr. 26, 1976, abandoned.

[30] Foreign Application Priority Data

Apr. 28, 1975 [CH] Switzerland ................. 5444/75

[51] Int. Cl.$^2$ ................. C08L 63/00; C08L 63/06
[52] U.S. Cl. ................. 260/40 R; 260/37 EP; 428/415; 525/119
[58] Field of Search ................. 260/835, 40 R

[56] References Cited

U.S. PATENT DOCUMENTS

| | | | |
|---|---|---|---|
| 3,529,034 | 9/1970 | Groff | 260/835 |
| 3,576,903 | 4/1971 | Groff | 260/835 |
| 3,641,194 | 2/1972 | Schmid | 260/835 |
| 3,642,674 | 2/1972 | Schmid | 260/835 |
| 3,642,938 | 2/1972 | Schmid | 260/835 |
| 3,655,817 | 4/1972 | Lohse | 260/835 |
| 3,739,041 | 6/1973 | Schmid | 260/835 |
| 3,816,365 | 6/1974 | Schmid | 260/835 |
| 3,937,751 | 2/1976 | Schmid | 260/835 |
| 3,979,477 | 9/1976 | Schmid | 260/835 |
| 3,985,825 | 10/1976 | Schmid | 260/835 |

FOREIGN PATENT DOCUMENTS

| | | | |
|---|---|---|---|
| 1182728 | 3/1970 | United Kingdom | 260/835 |
| 1225945 | 3/1971 | United Kingdom | 260/835 |

*Primary Examiner*—Paul Lieberman
*Attorney, Agent, or Firm*—Joseph F. DiPrima

[57] ABSTRACT

The invention relates to the manufacture of crystalline epoxide resins which have at least two crystallite melt temperatures. The cause of the crystallites are molecule blocks which are derived from aliphatic polyester-polycarboxylic acids. According to the invention, at least two aliphatic polyester-polycarboxylic acids (D and E), which bear a special relation to each other in respect of the number of —CH$_2$ groups in the primary chain member, are reacted under very specific quantitative conditions with epoxide compounds which contain at least 2 epoxide groups and optionally with curing agents. The synthetic resins thereby obtained are particularly suitable for use as storage material in latent heat accumulators.

23 Claims, No Drawings

PROCESS FOR THE MANUFACTURE OF CRYSTALLINE, CROSSLINKED EPOXIDE RESINS

This is a continuation of application Ser. No. 680,264, filed on Apr. 26, 1976, now abandoned.

The invention relates to crystalline, crosslinked epoxide resins in which the crystallite-forming elements are essentially aliphatic polyester chains and which have at least two different crystallite melting points.

In the present document and in accordance with the present invention, a crystalline epoxide resin is to be understood as a product which is usually partially crystalline.

Various epoxide resins, all of which contain, as crystallites, the radicals of a long-chain aliphatic polyester-polycarboxylic acid, are already known. In this connection, British Pat. Nos. 1,164,584 and 1,283,653 should be mentioned in particular. These products are crystalline synthetic resins which exhibit relatively high elongations at break below their crystallite melting point. If they are warmed to a temperature above the crystallisation transition temperature, they then exhibit rubbery-elastic properties. In this rubbery-elastic state, their dimensional stability is too low for many applications, for example as constructional materials. However, this means that these synthetic resins which have a low crystallite melting point (for example 20° to 50° C.) cannot be used for such applications at the customary average temperatures. If the synthetic resins have higher crystallite melting points (for example of ≧70° C.), their toughness rapidly decreases at room temperature. For this reason, synthetic resins of this type also are not very suitable for certain applications, for example as constructional materials or building materials.

The object of the invention is to provide crystalline, crosslinked epoxide resins which do not exhibit this adverse behaviour of the plastics according to the prior art discussed above. They must, therefore, have an adequate dimensional stability, and in particular be sufficiently tough and flexible, overwide temperature ranges.

The subject of the invention is a process for the manufacture of crystalline, crosslinked epoxide resins, which is characterised in that epoxide compounds, containing two or more epoxide groups, are reacted.

(a) with polyester-polycarboxylic acids D which essentially contain segments of the formula I

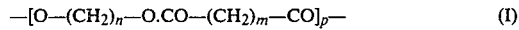

in which n and m are identical or different and denote 2 or a higher number than 2, and to which the condition $n+m=6$ to 30 applies, and in which p denotes a number from 2 to 40, which, however, is sufficiently large that the segment contains at least 30 —CH$_2$—groups, and (b) with polyester-polycarboxylic acids E which essentially contain segments of the formula II

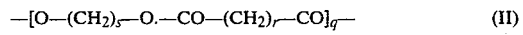

in which s and r are identical or different and denote 2 or a higher number than 2, and to which the condition $s+r+2\leqq n+m$ applies, and in which q represents a number from 6 to 30, which, however, is sufficiently large that the segment contains at least 30 —CH$_2$— groups, and (c) if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid D and the remaining 9/10 to 1/10 to the polyester-polycarboxylic acid E, and that up to 0.6 equivalent of curing agent C is present per equivalent of epoxide compound, with the proviso that, in the cases in which only difunctional epoxide compounds and difunctional polyester-polycarboxylic acids D and E are employed, the epoxide groups must be present in excess and the reaction with a curing agent C is essential.

Preferably, the condition $n+m=8$ to 24 applies in the formula I.

The epoxide resins obtained according to the invention are distinguished by a feature which was previously not known for synthetic resins. That is that they exhibit several pronounced crystallite melting points, preferably two (Tm$_1$ and Tm$_2$). Tm$_1$ is in the range from 20° to 70° C., preferably 25° to 60° C., and Tm$_2$ is in the range from 50° to 120° C., preferably 50° to 100° C. The crystallite-forming elements for Tm$_1$ and Tm$_2$ are the polyester-polycarboxylic acids D and E employed in the manufacturing process. Sometimes, the particular crystallite melting point is split. This means that in such cases the crystallite melting point manifests itself as a two-stage melting point.

It is surprising that when two polyester segments of similar structure are employed in crystalline, crosslinked polymers, two different crystallites are formed and, even when the content of one component is relatively low, the melting point of this component is only slightly influenced.

Preferably, the procedure followed according to the invention is such that 0.7 to 1.2, especially 0.9 to 1.1, equivalents of polyester-carboxylic acid are present per equivalent of epoxide compound.

The polyester-polycarboxylic acids D and E used in the reaction can for practical purposes be manufactured by the same basic process, by esterification of corresponding aliphatic dialcohols and aliphatic dicarboxylic acids or by forming esters of suitable derivatives of these alcohols and dicarboxylic acids, such as, for example, the anhydrides, acid chlorides and the like. The dicarboxylic acids must be present in excess.

Where minor amounts of aliphatic polyalcohols with at least 3 OH groups, especially glycerol, are also used, branched, that is to say at least 3-functional, polyester-polycarboxylic acids D and E are obtained. The use of the latter in the reaction according to the invention is also a preferred form of the invention. Branched polyester-polycarboxylic acids D and E which are obtained if small amounts of polycarboxylic acids, or their anhydrides, with at least 3 carboxyl groups (such as, for example, trimellitic acid) are also present during the manufacture of the polyester-polycarboxylic acids, are equally suitable for the reaction according to the invention.

However, it is also possible to employ branched polyester-polycarboxylic acids D and E, which are obtainable by esterification of the terminal OH groups of long-chain polyester-polyols, especially of polyester-diols, with polycarboxylic acids which contain at least 3 —CO.OH groups, such as, for example, trimellitic acid, or with corresponding anhydrides.

The basic rules for the manufacture of the polyester-polycarboxylic acids D and E used according to the present invention in other respects entirely correspond to those which have to be observed for the manufacture of the "long-chain dicarboxylic acids" employed according to British Patent No. 1,164,584, and which are described in detail in this British patent. Further data on the basic principles of the manufacture of such long-chain, aliphatic polyester-polycarboxylic acids are also to be found in a publication by Hans Batzer et al. in "Die Angewandte Makromolekulare Chemie" 1973, page 349–412.

Examples of suitable polyester-polycarboxylic acids D are those based on the following polyalcohols and polycarboxylic acids:
11 mols of adipic acid—10 mols of hexanediol
11 mols of sebacic acid—10 mols of hexanediol
5 mols of decanedicarboxylic acid—4 mols of dodecanediol
11 mols of dodecanedicarboxylic acid—10 mols of butanediol
16 mols of adipic acid—15 mols of hexanediol
11 mols of dodecanedicarboxylic acid—10 mols of hexanediol
11 mols of dodecanedicarboxylic acid—10 mols of propane-1,3-diol
11 mols of dodecanedicarboxylic acid—10 mols of dodecane-1,12-diol
5 mols of dodecanedicarboxylic acid—4 mols of dodecane-1,12-diol
11 mols of sebacic acid—10 mols of butanediol
11 mols of sebacic acid—10 mols of dodecanediol
5 mols of sebacic acid—4 mols of dodecanediol Examples of suitable polyester-polycarboxylic acids E are those based on the following polyalcohols and polycarboxylic acids:
11 mols of sebacic acid—10 mols of hexanediol
11 mols of adipic acid—10 mols of hexanediol
11 mols of succinic acid—10 mols of butanediol
17 mols of succinic acid—14 mols of butanediol
21 mols of succinic acid—20 mols of butanediol
22 mols of succinic acid—21 mols of butanediol
Glycerol—of succinic acid—butanediol (1:24:21)
Trimethylolpropane—succinic acid—butanediol (1:30:27)
Glycerol—succinic acid—butanediol (1:17:14)
Glycerol—succinic acid—butanediol (1:30:27)
31 mols of succinic acid—30 mols of butanediol
16 mols of adipic acid—15 mols of hexanediol
11 mols of sebacic acid—10 mols of butanediol
11 mols of dodecanedicarboxylic acid—10 mols of propanediol
7 mols of dodecanedicarboxylic acid—6 mols of propanediol
7 mols of dodecanedicarboxylic acid—6 mols of butanediol
5 mols of sebacic acid—5 mols of hexanediol In principle, it is also possible, according to the invention, to use a procedure such that the reaction is allowed to proceed in the presence of at least one further aliphatic polyester-polycarboxylic acid, which although it is similar to the polyester-polycarboxylic acids D and E differs from these in respect of structure and molecular weight. This results in the development of at least one further (third) crystallite melting point in the end product.

As epoxide compounds containing two or more epoxide groups it is possible to employ practically all the polyepoxy compounds known to those skilled in the art, from publications and patent specifications. According to the invention, one or more different epoxide compounds can be reacted. Triglycidyl isocyanurate and triglycidyl compounds which contain one or more hydantoin groups and/or dihydrouracil groups, especially epoxide compounds of the formula III

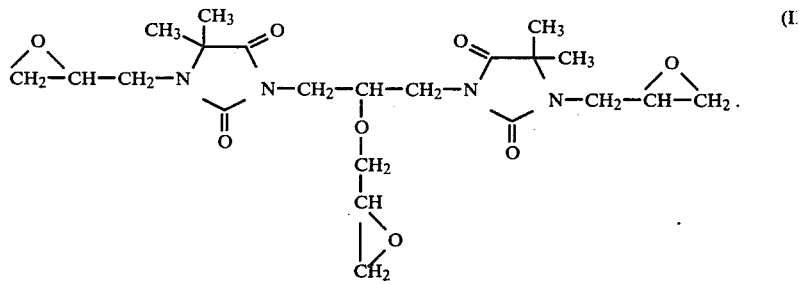

are particularly suitable.

In principle, the reaction according to the invention can be carried out either in 1 stage or in several stages. If the epoxide compounds used have at least 3 epoxide groups, and polyester-dicarboxylic acids D and E are employed, it is possible, for example, to carry out the reaction in 1 stage, that is to say to start from a reaction mixture which contains all the reactants simultaneously. It is possible to proceed in exactly the same way (that is to say in 1 stage) if, instead of the dicarboxylic acids, polyester-polycarboxylic acids D and E which have at least 3 carboxyl groups are employed. In the converse case, that is to say when using polyester-polycarboxylic acids D and E containing at least 3 carboxyl groups, and using diepoxy compounds, working in 1 stage is again possible and is the normal method of reaction for such cases.

If only diepoxide compounds and only polyester-dicarboxylic acids are employed, it is only possible to work in one stage if an excess of epoxide compounds is used and at the same time a polycarboxylic acid anhydride is added.

In the multi-stage method, an adduct containing epoxide groups is initially manufactured, in a first stage, from the epoxide compounds and the polyester-polycarboxylic acids D and/or E, preferably using 0.5 to 1 equivalent of polyester-polycarboxylic acid per 2 equivalents of epoxide compounds. In a second reaction stage, the crosslinking is then carried out, by reaction of the adducts with the remainder of the polyester-polycarboxylic acids D and/or E. It is also possible to proceed by carrying out the cross-linking in the second stage in the presence of customary curing agents. It is also possible additionally to add yet further monomeric epoxide compounds and correspondingly larger amounts of curing agents.

As customary curing agents for epoxide resins it is, according to the invention, possible to employ all the substances which are described in the numerous publications and patents relating to epoxide resins. inter alia, the following substances may be listed here: compounds with amino groups, polyalcohols, polycarboxylic acids and their anhydrides, acid amides, polyesters, phenol-formaldehyde condensates and amino-resin precondensates. Tertiary amines and imidazoles may be mentioned as examples of suitable accelerators.

The reaction according to the invention is preferably carried out in the melt. For this, preferably temperatures of between 50° and 200° C. and reaction times of more than 1 hour and up to about 20 hours are required. In principle, the reaction according to the invention can also be carried out in solution.

Before or during the reaction according to the invention, a blowing agent for the manufacture of foams can also be added.

The crystalline, crosslinked plastic products are as a rule manufactured according to the invention with simultaneous shaping, to give castings, foamed articles, pressings, lacquer films, laminates, adhesive bonds, granules and the like.

Of course, other customary additives, such as fillers, reinforcing agents, mould release agents, agents to protect against aging, flameproofing substances, dyestuffs or pigments, can be added to the moulding compositions.

Suitable fillers or reinforcing agents are fibrous or pulverulent inorganic or organic substances. Quartz powder, aluminium oxide trihydrate, mica, aluminium powder, iron oxide, ground dolomite, chalk powder, gypsum, slate powder, unburnt kaolin (bolus), burnt kaolin, glass fibres, boron fibres and asbestos fibres may be mentioned. A content of materials, in the form of fibres and powders, which assist the heat conductivity can sometimes prove particularly advantageous. Examples of such materials are metals (for example aluminium powder), carbon, such as carbon black and graphite in powder form, and carbon fibres.

For the purpose of optimum and accelerated development of the crystal structure of the polymers it is also advisable to add nucleating agents, such as phthalocyanines, carbon black, α-naphthoic acid or the like.

Because of their good properties, which have already been mentioned above, and especially because of the outstanding toughness over a wide temperature range, the epoxide resins which can be manufactured according to the invention are particularly suitable as constructional materials for technical applications. It is surprising that the good properties which are exhibited by these synthetic resins below the lower crystallite melting point ($Tm_1$) are retained even at higher temperatures, that is to say above $Tm_1$. In contrast, after the crystallite melting point has been exceeded, the synthetic resins of the state of the art, which have been discussed above, change into the state of a valueless "limp" rubber, which precludes their use as a constructional material. It must also be emphasised that the advantageous properties exhibited above $Tm_1$ by the products manufactured according to the invention can be further improved by employing those polyester-polycarboxylic acids E which result in a particularly high $Tm_2$. A controlled variation of the toughness and the flexibility can be realised in this way.

The epoxide resins which can be manufactured according to the invention also exhibit a further special characteristic. This is that, below the two crystallite melting points they are distinguished by a particularly advantageous resilience of about 70%. They are therefore suitable for the manufacture of golf balls and the like.

One use of the crystalline, crosslinked epoxide resins manufactured according to the invention is as a storage material in so-called latent heat stores. As is known, those installations in which the phenomenon of the absorption and re-release of latent heat during melting or crystallisation of bodies or during boiling or condensation of liquids is utilised for the storage of heat energy are termed latent heat accumulators.

For latent heat accumulators, in which the heat of fusion is stored, it has hitherto been primarily salt solutions and salt mixtures which are used as the storage medium. However, when salt solutions and salt melts are used there are always severe corrosion problems. For this reason, it is predominantly corrosion-resistant metal containers which are used to contain the salts, but these containers are heavy and conduct heat well; this is a disadvantage, quite apart from the fact that such containers make the total installations expensive. Furthermore, fractures and leaks of the salt containers and pipes must always be expected, and this results in extremely undesirable exudation of the solutions or melts.

The literature states that practically any desired melting point can be obtained by appropriate choice of the salt or by mixing different salts. In reality, however, the situation is not quite so favourable, because if a salt mixture which does not correspond to a eutectic composition is chosen, demixing phenomena always occur when the melt solidifes. Only purely eutectic mixtures crystallise in a constant composition. They are, therefore, for practical purposes the only storage material used at the present time. However, eutectic melts have a great tendency to supercooling and must therefore be seeded. This in turn, however, has the consequence that here again demixing phenomena gradually manifest themselves. It is not possible to realise, by continuous progression, any desired melt temperature by choosing eutectic salt mixtures, if only because the number of eutectics is limited. Furthermore, some eutectic melt temperatures can only be obtained by choosing unusual expensive salts, which a priori precludes the practical realisation of such eutectics.

When the crystalline, crosslinked epoxide resins manufactured according to the invention are used as the storage material in latent heat accumulators none of these disadvantageous properties and phenomena of the known storage materials arise and the melting point of the particular storage material can be varied in a controlled manner. To this extent, the present invention represents a very particular enrichment of the art.

The crystalline, crosslinked epoxide resins manufactured according to the invention are of particular interest as heat rectifiers, in which the enthalpy of fusion of the polyester segment which has the lower melting point is used for storage, that is to say for heat insulation and subsequent release of heat, and the crystallites which have the higher melting point are used to maintain the mechanical strength.

The invention also relates to the crystalline, crosslinked epoxide resins which can be manufactured by the process according to the invention, especially those resins which have a lower crystallite melting point in the range from 20° to 70° C. and an upper crystallite melting point in the range from 50° to 120° C.

EXAMPLE 1

108 g (0.1 equivalent) of an acid polyester, prepared from 11 mols of adipic acid and 10 mols of hexanediol and 155 g of an acid polyester prepared from 11 mols of sebacic acid and 10 mols of hexanediol (both prepared by the melt process) are warmed to 100° C. and mixed well with 22 g (0.2 equivalent) of triglycidyl isocyanurate and the mixture is poured into Anticorodal moulds which have internal dimensions of 150×150×1 mm, have been pre-treated with a silicone mould-release agent and have been pre-warmed to 120° C. The mixture is cured for 16 hours at 140° C. Crystalline, tough mouldings with the following properties are obtained:

| Tensile strength according to VSM 77,101 (moulding No. 1)* | = 18 N/mm² |
|---|---|
| Elongation at break | = 520% |
| Crystallite melting point $Tm_1$** | = 27° C. |
| Crystallite melting point $Tm_2$ | = 50° C. |

*The mouldings are punched from the 1 mm thick sheet using a punching tool. The tensile test also corresponds to ISO R 527
**Determined with a differential scanning calorimeter (heating rate = 10° C./minute).

The sheet has two melting points which are ascribed to the two polyesters used. Above the melting points, the moulding is soft and rubbery-elastic.

EXAMPLE 2

(a) 262 g (0.1 equivalent) of an adduct of 2.0 equivalents of tetrahydrophthalic acid diglycidyl ester and 1.0 equivalent of an acid polyester obtained from 21 moles of succinic anhydride and 20 mols of butanediol are warmed, together with 16.0 g of hexahydrophthalic acid diglycidyl ester, to 120° C. and mixed well with 108 g (0.1 equivalent) of an adipic acid-hexanediol polyester (11:10) and 26.6 g of dodecenylsuccinic anhydride (0.1 mol), the system is evacuated and the mixture is poured into the moulds according to Example 1. After curing for 16 hours at 140° C., crystalline, tough mouldings with the following characteristics are obtained:
$Tm_1$:45° C.
$Tm_2$:102° C.
(b) When the same molar amounts of hexahydrophthalic anhydride are used in place of dodecenylsuccinic anhydride and the composition and processing are otherwise identical to those in Example 2a, mouldings with the following characteristics are obtained:
$Tm_1$:40° C.
$Tm_2$:101° C.

EXAMPLE 3

140 g (0.9 equivalent) of an 11:10 sebacic acid/hexanediol polyester and 15.4 g (0.01 equivalent) of an acid (21:20) succinic acid/butanediol polyester are warmed to 120° C. and mixed well with 11 g (0.1 equivalent) of triglycidyl isocyanurate and the mixture is processed analogously to Example 1. The resulting mouldings had the following characteristics:
$Tm_1$:58° C.
$Tm_2$:100° C.

In accordance with the relatively small amount of succinic acid-butanediol polyester, the peak for the melting point at 100° C., in the DSC, was only small compared with that of the sebacic acid polyester at 58° C.

EXAMPLE 4

0.1 equivalent of an acid polyester obtained from 11 mols of adipic acid and 10 mols of hexanediol (equivalent weight=1,080), 0.1 equivalent of a branched acid polyester obtained from 17 mols of succinic acid, 14 mols of butane-1,4-diol and 1 mol of glycerol (equivalent weight=1,460) and 0.2 equivalent of a hexahydrophthalic acid diglycidyl ester with an epoxide equivalent weight of 160 are warmed and mixed well. After adding 0.3%=0.9 g of 1-methylimidazole, the mixture is evacuated and poured into aluminium tubes. After heating to 140° for 16 hours, crystalline, crosslinked mouldings with the following characteristics are obtained:
$Tm_1$=34 and 43° C. (that is a two-stage melting point)
$Tm_2$=85° C.

EXAMPLE 5

The procedure is as in Example 4, but with the difference that 0.2 equivalent of the triepoxide compound of the formula III with an equivalent weight of 167 are employed in place of hexahydrophthalic acid diglycidyl ester and that, in addition, 40 g of aluminium powder and 0.6 g of β-Cu phthalocyanine blue are added to the melt as a nucleating agent and dyestuff respectively. Very tough, blue mouldings with the following crystallite melting points are obtained:
$Tm_1$=38° C.
$Tm_2$=76° C.

EXAMPLE 6

When 3 g of α-naphthoic acid are used in place of 0.6 g of β-Cu phthalocyanine blue and otherwise the composition and processing are identical to those in Example 5, mouldings with the following characteristics are obtained:
$Tm_1$=40° C.
$Tm_2$=75° C.

EXAMPLE 7

Three layers of a glass mat are laid in an Anticorodal mould, which as internal dimensions of 8×200×200 mm and has been treated with a silicone mould-release agent, and are impregnated hot with the resin mixture described in Example 5, but without aluminum powder and β-Cu phthalocyanine blue. After evacuating the system for a short time, the mixture is cured at 140° C. for 16 hours. A soft, flexible but extremely tough laminate which has the following characteristics is obtained:
$Tm_1$=37° and 48° C. (two-stage melting point)
$Tm_2$=79° C.

EXAMPLE 8

9.62 g (=0.005 equivalent) of an adduct of 2 mols of hexahydrophthalic acid diglycidyl ester and 1 mol of an acid polyester obtained from 11 mols of sebacic acid and 10 mols of hexanediol and 13.15 g (=0.005 equivalent) of an adduct of 2.2 mols of tetrahydrophthalic acid diglycidyl ester and 1.0 mol of an acid polyester obtained from 22 mols of succinic anhydride and 21 mols of butane-1,4-diol and also 1.54 g (=0.01 mol) of hexahydrophthalic anhydride are mixed well whilst hot (about 130° C.) and, after adding 0.07 g of 1-methylimidazole, the mixture is poured into tubes and cured for 16 hours at 140° C. The mouldings are very tough and have the following crystallite melting points:
$Tm_1$=52° C.

$Tm_2 = 84°$ C.

EXAMPLE 9

8.32 g of an acid polyester obtained from 5 mols of decanedicarboxylic acid and 4 mols of dodecanediol (equivalent weight = 832) and 10.8 g (=0.01 equivalent) of the adipic acid-hexanediol polyester used in Example 1 and 3.3 g (=0.02 equivalent) of the triepoxide compound used in Example 5 are mixed well at 120° C. and, after adding 0.07 g of 1-methylimidazole, the system is evacuated and the mixture is poured into an aluminium tube. Again, opaque, tough mouldings, which have the following crystallite melting points, are obtained:
$Tm_1 = 49°$ C.
$Tm_2 = 54°$ C.

EXAMPLE 10

9.62 g (=0.005 equivalent) of the sebacic acid-hexanediol polyester adduct described in Example 8 and 13.5 g (=0.005 equivalent) of the succinic acid-butanediol polyester adduct, which is also described in Example 8, and also 5.4 g (=0.005 equivalent) of an (11:10) adipic acid-hexanediol polyester and 0.8 g (=0.005 equivalent) of hexahydrophthalic anhydride and 0.09 g of 1-methylimidazole are mixed at 130° C. and the mixture is poured into an aluminium tube. After curing for 16 hours at 140°, mouldings with the following crystallite melting points are obtained:
$Tm_1 = 37°$
$Tm_2 = 52°$
$Tm_3 = 76°$ The three melting points show that, even in cross-linked polymers, each polyester aggregates on its own to form crystallites.

We claim:
1. Process for the manufacture of crystalline, cross-linked epoxide resins having at least two different crystallite melting points, characterized in that epoxide compounds, containing two or more epoxide groups, are reacted
   (a) with polyester-polycarboxylic acids D which consists essentially of segments of the formula I

$$-[O-(CH_2)_n-O.CO-(CH_2)_m-CO]_p-\quad (I)$$

in which n and m are identical or different and denote 2 or a higher number than 2, and to which the condition $n+m = 6$ to 30 applies, and in which p denotes a number from 2 to 40, which, however, is sufficiently large that the segment contains at least 30 —$CH_2$—groups and
   (b) with polyester-polycarboxylic acids E which is different from the polyester-polycarboxylic acid D which consists essentially of segments of the formula II $$-[O-(CH_2)_s-O.CO-(CH_2)_r-CO]_q-tm\quad (II)$$

in which s and r are identical or different and denote 2 or a higher number than 2, and to which the condition $s+r+2 \leq n+m$ applies, and in which q denotes a number from 6 to 30, which, however, is sufficiently large that the segment contains at least 30 —$CH_2$—groups, and
   (c) if appropriate, with curing agents C, and, if appropriate, in the presence of accelerators, in a ratio such that 0.5 to 1.2 equivalents of polyester-polycarboxylic acid are present per equivalent of epoxide compound, that 1/10 to 9/10 of these 0.5 to 1.2 equivalents are attributable to the polyester-polycarboxylic acid D and the remaining 9/10 to 1/10 to the polyester-polycarboxylic acid E, and that up to 0.6 equivalent of curing agent C is present per equivalent of epoxide compound, with the proviso that, in the cases in which only difunctional epoxide compounds and difunctional polyester-polycarboxylic acids D and E are employed, the epoxide groups must be present in excess and the reaction with a curing agent C is essential.

2. Process according to claim 1, characterised in that the reactants are reacted in a ratio such that 0.7 to 1.2, preferably 0.9 to 1.1, equivalents of polyester-polycarboxylic acid are present per equivalent of epoxide compound.

3. Process according to claim 1, characterised in that the reaction is preferably carried out for 1 to 20 hours in the melt at temperatures between 50° and 200° C.

4. Process according to claim 1, characterised in that a single epoxide compound is reacted.

5. Process according to claim 1, characterised in that several expoxide compounds are reacted.

6. Process according to claim 1, characterised in that the epoxide compounds employed are those of the group comprising triglycidyl isocyanurate and triglycidyl compounds which contain one or more hydantoin groups and/or dihydrouracil groups, especially the epoxide compound of the formula III

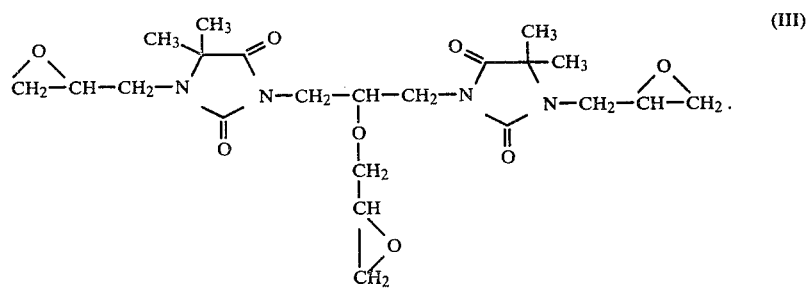

7. Process according to claim 1, characterised in that polyester-dicarboxylic acids are employed as polyester-polycarboxylic acids D and/or E.

8. Process according to claim 1, characterised in that the polyester-polycarboxylic acids D and/or E which are employed are those which contain at least 3 carboxyl groups.

9. Process according to claim 1, characterised in that at least one adduct containing epoxide groups is manufactured, in a 1st stage, from the epoxide compounds and the polyester-polycarboxylic acids D and/or E, preferably using 0.5 to 1 equivalent of polyester-polycarboxylic acid per 2 equivalents of epoxide compounds, and, in a second stage, is crosslinked with the remaining polyester-polycarboxylic acids and/or curing agents, optionally after the addition of further epoxide compounds.

10. Process according to claim 1, characterised in that the polyester-polycarboxylic acids D and/or E employed are preferably polyester-dicarboxylic acids and the epoxide compounds employed are those containing at least 3 epoxide groups.

11. Process according to claim 1, characterised in that the polyester-polycarboxylic acids D and/or E employed are those containing at least 3 carboxyl groups, preferably polyester-tricarboxylic acids and/or polyester-tetracarboxylic acids, and the epoxide compounds employed are preferably diepoxide compounds.

12. Process according to claim 10 or 11, characterised in that the reaction is carried out using a ratio such that approximately 1 equivalent of polyester-carboxylic acid is present per equivalent of epoxide compound and in that no curing agent C is employed.

13. Process according to claim 10 or 11, characterised in that the reaction is carried out using excess of epoxide groups, compared with the —CO.OH groups of the polyester-polycarboxylic acids, and that a curing agent is also used, preferably in an amount which is required for the crosslinking reaction of the excess epoxide groups.

14. Process according to claim 1, characterised in that the polyester-polycarboxylic acids D and E employed are polyester-dicarboxylic acids and the epoxide compounds employed are those containing 2 epoxide groups.

15. Process according to claim 14, characterised in that the reaction is carried out in a single stage using a ratio such that approximately 0.6 to 0.9 equivalent of polyester-carboxylic acid is present per equivalent of epoxide compound and in that a carboxylic acid anhydride is also used, preferably in an amount which is required for the crosslinking reaction of excess epoxide groups, as the curing agent.

16. Process according to claim 14, characterised in that at least one adduct containing epoxide groups is manufactured, in a first stage, from the epoxide compounds and the polyester-polycarboxylic acids D and/or E, preferably using 0.5 to 1 equivalent of polyester-polycarboxylic acid per 2 equivalents of epoxide compound, and, in a second stage, is crosslinked by reaction with customary curing agents.

17. Process according to claim 1, characterised in that a blowing agent for the manufacture of foams is added before or during the reaction.

18. Process according to claim 1, characterised in that the reaction is allowed to proceed in the presence of at least one further aliphatic polyester-polycarboxylic acid, which differs from the polyester-polycarboxylic acids D and E and which causes at least one further (third) crystallite melting point to develop.

19. Process according to claim 1, characterised in that nucleating agents, preferably phthalocyanines and/or α-naphthoic acid, are added to the reaction mixture before or during the reaction.

20. Process according to claim 1, characterised in that fillers, preferably substances which promote the conductivity of heat, such as aluminium, carbon black and graphite, are added to the reaction mixture before or during the reaction.

21. Crystalline, crosslinked epoxide resins, characterised by two crystallite melting points and manufactured by the process according to claim 1.

22. Epoxide resins according to claim 21, characterised in that they have a lower crystallite melting point in the range from 20° to 70° C. and an upper crystallite melting point in the range from 50° to 120° C.

23. crystalline, crosslinked epoxide resins having at least two different crystalline melting points manufactured according to the process of claim 1.

* * * * *